Patented Oct. 31, 1922.

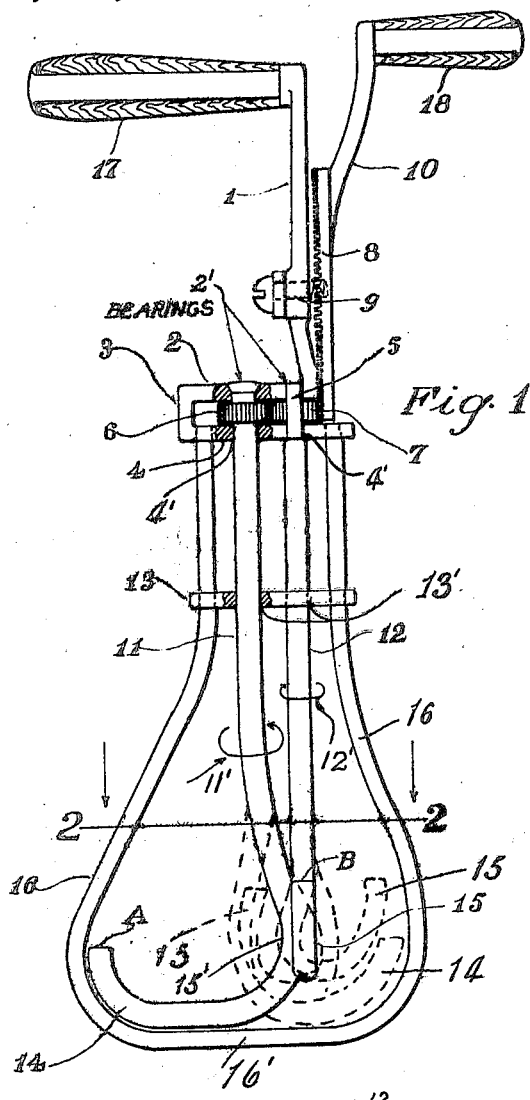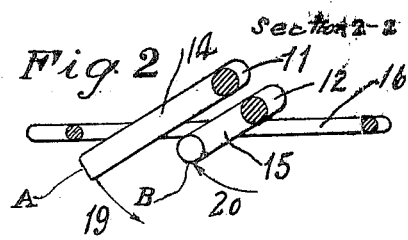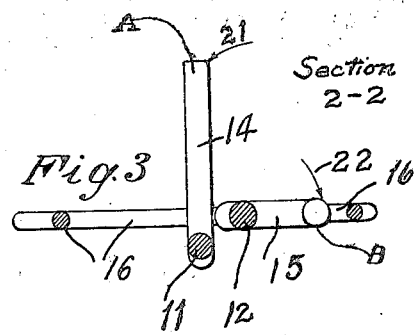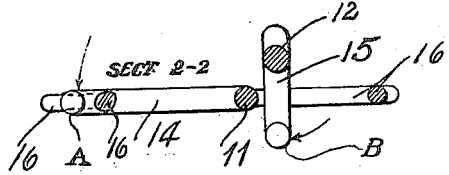

1,433,710

UNITED STATES PATENT OFFICE.

CARL E. FLINK, OF SPRINGFIELD, JOHN E. BECK, OF CHICOPEE FALLS, AND GUS L. OLSON, OF SPRINGFIELD, MASSACHUSETTS.

CAKE MIXER.

Application filed May 24, 1922. Serial No. 563,286.

*To all whom it may concern:*

Be it known that we, CARL E. FLINK, JOHN E. BECK, and GUS L. OLSON, citizens of the United States of America, residing at Springfield, Chicopee Falls, and Springfield, respectively, county of Hampden, State of Massachusetts, have invented certain new and useful Improvements in Cake Mixers, of which the following is a specification.

This invention relates to improvements in mixing devices and more particularly to devices for thoroughly mixing together the ingredients which enter into cakes and pastries of various kinds.

Broadly considered it comprises a rigid frame work including a holding handle forming a part thereof, an operating gear and a pair of stirring rods or members which are driven or operated from the gear and means for rotatably supporting the rods.

One of the principal objects of our invention is to provide a cake mixing device whereby the dough is separated and pulled apart to permit the entrance of air in order to render it light.

Further objects and nature of the invention will appear in the body of the specification and will be particularly pointed out in the claims.

Referring to the drawings:

Fig. 1 is a side elevational view, partly in section, showing the main operating gear wheel, the stirring rods, the supports therefor, and the gear connections between the main gear and the rods.

Figs. 2, 3, and 4 are detail sectional views of different positions of the stirring rods, the sectional plane being indicated by the line 2—2 of Fig. 1.

Referring to the drawings in detail:

The numerals 1, 2, 3 and 4 designate the parts composing the main casting. 5 is an integral bar, or cross piece which connects the parts 2 and 4 of the casting. 6 and 7 are a pair of spur gears which mesh with each other and are driven by the main operating gear 8 which is mounted for rotary movement in the upright part 1 of the main casting; the pivotal or bearing part for the main gear is indicated at 9. 10 is an operating handle or arm member which is preferably cast integral with the main gear 8. 11 and 12 are two downwardly extending stirring or mixing rods, their upper ends are fixedly secured to the gears 6 and 7 respectively. These rods have a bearing in openings in the members 2, 4, and 13 as indicated at 2', 4', and 13'. Their downwardly extending lower ends are curved as indicated at 14 and 15. 16 is a rigid one piece bar which is fixedly secured at its upper ends to the casting or part 4 in any suitable way as by indenting or upsetting the metal of the part 4 against the upper ends of the bar 16. This bar, as shown extends downward and passes through openings in the bar 13 to which it is fixedly secured. Its lower part 16' serves as a support for the device when in use. The operator places one hand on the fixed handle 17 and presses downward, with the other hand 18, a rotary motion is imparted to the main gear wheel 8 which in turn drives the spur gears 6 and 7 which operate the stirring or mixing rods 11 and 12 in opposite directions as shown by the arrows 11' and 12' thereon.

The curved portions 14 and 15 of the mixing rods tend to tear or pull the dough apart instead of twisting it into a solid ball. This operation therefore thoroughly aerates or lightens the dough which is a very desirable quality in the cake or pastry making art.

Referring now to the different positions of the rotatable rods 11 and 12. Fig. 2 shows a position in which the curved ends 14 and 15 are in nearly a parallel position and the handle 18 in the position shown now, when these ends are rotated they will rotate in opposite directions as shown by the arrows 19 and 20, these curved ends will have the effect of pulling or separating the dough in which they are supposed to be imbedded. After a slight rotation the positions of the rods 11 and 12 the curved ends 14 and 15 will assume that shown in Fig. 3. The handle 18 has now moved through about 90°. In this position the ends A and B of the rods are separated about 90°. The arrows 21 and 22 which indicate these ends are moving in opposite directions. A little further movement of the handle 18 will bring the pulling ends A and B into the position shown in Fig. 4 with the end A near to the fixed frame 16, and the center of the curve 15' near to the rod 11 as shown.

The dotted lines in Fig. 1 shows in a general way the various positions of the curved ends 14 and 15 of the rods 11 and 12 during their different positions during their rotative movements.

An important feature is the successive movements of the rod 12 about the rod 11 whereby the end B of the rod 12 passes into the curved part 15′ of the curve 15 and out again. Also, there is at all times a continual pulling or separating of the material being mixed. There is therefore no possibility of the material being mixed or being wound or twisted into a solid ball or mass.

It will be noticed from the different figures that the mixing rod having the smaller curvature passes within the larger curved part of the other rod during a part of its path of rotation and outside of the larger curved part during another part of its path whereby the mixing or stirring process will be carried out in all parts of the mass being operated upon or in other words the stirring and aerating process is complete. It is of course understood that the rods 11 and 12 revolve in opposite directions.

What we claim is:

1. In a device of the kind described, the combination, of a one piece frame work, a main gear pivotally connected thereto, a pair of rotatable mixing rods which are formed with curved ends, a gear connected to each of the rods which mesh with each other and operated from the main gear, the curved ends being so formed and located with relation to each other that when the rods are rotated the ends will serve to effect a pulling action on the material being mixed.

2. In a device of the kind described, the combination, of a main frame, a stationary member connected thereto and formed with a laterally extending supporting base part, a fixed bar connected to said member and formed with openings to receive a pair of parallel and rotatable mixing rods having meshing gears thereon said rods having their lower ends bent upwards, a main gear for operating said gears, the rods having bearings in the main frame and above and below the meshing gears, the lower curved ends being so formed that during their rotation said ends will operate to successively produce a pulling operation on the materials being mixed, whereby the materials will be aerated as described.

3. In a device of the kind described, the combination of a main frame, an integral upright member serving as a support for a handle a supporting frame connected to the main frame, a pair of mixing or stirring rods, gears for operating the rods, means for operating the gears, said rods, having curved lower ends of different curvatures, the curved lower part of the rod of smaller curvature being arranged to move within the larger curved part of the other rod in one part of its path and outside of the larger curve in another part of its path.

4. In a device of the kind described, the combination, of a main frame, comprising upper and lower spaced members, gears in said space, stirring or mixing rods connected to the gears, a main gear connected to the main frame for driving said gears, a supporting rod connected to the main frame, a cross bar connected to the supporting rod, said rods having a bearing in the cross bar and in the spaced members.

5. In a device of the kind described, the combination, of a pair of rotatable mixing rods having curves at their lower ends of different radii and arranged to pass one within the path of the other, means for operating the rods in opposite directions, means for supporting the device when in use, means for operating the rod operating means, and means for supporting the rod operating means.

CARL E. FLINK.
JOHN E. BECK.
GUS L. OLSON.